US005822684A

United States Patent [19]

Kitakubo

[11] Patent Number: 5,822,684

[45] Date of Patent: Oct. 13, 1998

[54] ANTENNA SWITCHING CIRCUIT AND WIRELESS COMMUNICATION SYSTEM

[75] Inventor: Kazuto Kitakubo, Tokyo, Japan

[73] Assignee: Sony Corporation, Tokyo, Japan

[21] Appl. No.: 650,265

[22] Filed: May 22, 1996

[30] Foreign Application Priority Data

May 30, 1995 [JP] Japan .................................... 7-157198

[51] Int. Cl.[6] ........................................................ H04B 1/44

[52] U.S. Cl. .......................... 455/78; 455/277.1; 333/103

[58] Field of Search .................................. 455/73, 78, 80, 455/82, 83, 575, 90, 272, 277.1, 277.2; 333/101, 102, 103, 104, 1.1, 17.1, 17.3

[56] References Cited

U.S. PATENT DOCUMENTS

| | | | |
|---|---|---|---|
| 3,276,019 | 9/1966 | Fackler . | |
| 4,361,905 | 11/1982 | Etherington et al. | 455/80 |
| 4,987,392 | 1/1991 | Clark et al. . | |
| 5,047,674 | 9/1991 | Clark et al. | 455/78 |
| 5,060,293 | 10/1991 | Kok et al. . | |
| 5,276,914 | 1/1994 | Ishizuka et al. | 455/83 |
| 5,477,532 | 12/1995 | Hoshigami et al. | 455/83 |
| 5,594,394 | 1/1997 | Sasaki et al. | 455/78 |
| 5,701,595 | 12/1997 | Green, Jr. | 455/83 |

FOREIGN PATENT DOCUMENTS

| | | | |
|---|---|---|---|
| 0618635A3 | 3/1993 | European Pat. Off. . | |
| 0641090A3 | 8/1993 | European Pat. Off. . | |
| 0088443 | 4/1987 | Japan | 455/78 |
| 2279212 | 12/1994 | United Kingdom . | |

OTHER PUBLICATIONS

Patent Abstracts of Japan, vol. 9, No. 291, 19 Nov. 1985—bases on JP–A–60 130932 (Morita) publ'd 12 Jul. 1985.

*Primary Examiner*—Thanh Cong Le
*Attorney, Agent, or Firm*—Jay H. Maioli

[57] ABSTRACT

An antenna switching circuit (55) is constructed by a circulator element (63) having three terminals, of which the first terminal (CTX) is connected to the transmitting circuit, the second terminal (CANT) is connected to a first antenna (4), and the third terminal (CRX) can be connected to the terminal resistance (64) through a first switch element (62); a second switch element (60) capable of connecting the third terminal of the circulator element to the receiving circuit; and a third switch element (61) capable of connecting a second antenna (22) to the receiving circuit, whereby, it is no longer necessary to use a duplexer circuit having large insertion loss, the whole construction can be miniaturized, and the insertion loss can be reduced.

11 Claims, 8 Drawing Sheets

ANTENNA SWITCHING CIRCUIT AND WIRELESS COMMUNICATION SYSTEM

BACKGROUND OF THE INVENTION

1. Field of the Invention

The present invention relates to an antenna switching circuit and a wireless communication system including that circuit and is applicable to a wireless communication system of the time division multiple access kind for example.

2. Description of the Related Art

Heretofore, in the wireless communications device of the time division multiple access, kind such as a digital cellular telephone, one antenna can be used in common for transmitting and receiving by using an antenna switching circuit.

In the case of the cellular telephone, especially such as a portable telephone in which the terminal device is miniaturized considering the convenience of the user, the antenna setting location is limited and it is difficult to set antennas exclusively for transmitting and receiving. Therefore, as described above, one antenna is used in common for transmitting and receiving by using an antenna switching circuit.

As shown in FIG. 1, as a typical antenna switching circuit, a duplexer circuit utilizing filters can be given. In this duplexer circuit 1, a transmit signal STX to be outputted from the transmitting unit (not shown in FIG.) is supplied to the transmit-receive common antenna 4 through a band-pass filter (BPF) 2 and a phase shifter circuit 3.

Moreover, the antenna 4 is also connected to a phase shifter circuit 5, and a receive signal SRX received by the antenna 4 is outputted to the receiving unit (not shown in FIG.) through the phase shifter circuit 5 and a band-pass filter 6.

At this point, as shown in FIG. 2, the band-pass filter 2 is selected in order that the passing band becomes frequency band fT of a transmit signal STX in which the and out of band attenuation characteristic becomes steep and a receive signal SRX can be sufficiently controlled. Similarly, the band-pass filter 6 is selected so that the passing band becomes frequency band fR of a receive signal SRX in which the out of band attenuation characteristic becomes steep and a transmit signal STX can be controlled sufficiently. Thus, in the duplexer circuit 1, a transmit signal STX to be outputted from the transmitting unit can be selectively outputted to the antenna 4 and a receive signal SRX received at the antenna 4 can be selectively outputted to the receiving unit.

In this connection, the phase shifter circuits 3 and 4 are not necessarily needed but they are normally provided in order to improve isolation by adjusting the phase of each signal at the connection point of the band-pass filters 2 and 6. In this case, phase characteristics of the phase shifter circuits 3 and 5 will be selected in order that insertion loss becomes the minimum and isolation becomes the maximum.

Accordingly, basically the duplexer circuit 1 can be applied only to the system whose frequency bands differ when transmitting and when receiving. Also it can be applied to the communication system conducting transmission and reception simultaneously.

Furthermore, in the mobile communications such as cellular telephone system, there are cases where receiving power would be worsened due to fading since the wave arriving route becomes a multiplex propagation path. In order to avoid this, one supplemental antenna exclusively for receiving is provided in addition to the main antenna, and of the two antennas the one which receives more desired waves will be selected and to receive the signal, that is to antenna switching diversity reception may be used for the terminal device. In this case, generally the predetermined switch circuit will be used to the part which switches and selects two systems of antennas.

The antenna being used for mobile communications system such as cellular telephone has a feature that characteristic impedance is variable according to changes of surrounding conditions. For example, if the antenna is touched by the user's hand, a large quantity of high frequency power outputted from the power amplifier of the transmitting unit reflects due to the antenna mismatching and there are cases where it returns to the power amplifier. In this case, the operation of the power amplifier becomes unstable and as a result, it oscillates or distortion occurs and unnecessary radiation outside of the transmitting band occurs, and accordingly it may give interference to the other communications.

In order to prevent this, heretofore a signal separating element that is called an isolator has been inserted between the power amplifier of the transmitting side and the antenna.

This isolator is a three-terminal circulator element (non-reciprocal circuit element applied ferrite components) with one of the terminals terminated by resistance, and which permits the forward wave of transmitting power to pass with low loss, but the power of the reflected wave reflected at the antenna terminal would be converted to heat by the terminal resistance and would not return to the power amplifier of the transmitting side.

In the following paragraphs an isolator will be described referring to FIG. 3. As FIG. 3 shows, generally an isolator 10 is formed by a circulator 11 and a terminal resistance 12 combined.

The circulator 11 has 3 terminals, a, b, and c, and the terminal a is connected to the output terminal of a power amplifier 13 of the transmitting unit, the terminal b is connected to the antenna 4 and the terminal c is connected to the terminal resistance 12 respectively.

In this case, let's assume that the circulator 11 transmits signals clockwise as shown in FIG. 3. Firstly, a transmit signal STX outputted from the power amplifier 13 of the transmitting unit is outputted to the terminal b through the terminal a and the circulator 11. Since the antenna 4 is connected to the terminal b, the transmit signal STX is emitted in space from the antenna 4.

At this point, if mismatching occurs in the antenna 4, the part of the power, which is supposed to be emitted in space from the antenna 4, reflects at said antenna 4 and returns to the terminal b. However, since the reflected wave is transmitted from the terminal b clockwise and outputted to the terminal c, it is converted to heat by terminal resistance 12 and never returns to the power amplifier 13.

Thus, in utilizing the isolator 10 the transmitting unit such as the power amplifier 13 can be protected from the reflected wave produced due to the mismatching of antenna 4.

So far the antenna switching circuit, antenna switching diversity receiving and the necessity and operation of isolator have been described. However, there is a conventional antenna switching circuit in which these are combined. This antenna switching circuit will be described in the following paragraphs referring to FIG. 4.

As shown in FIG. 4, in this antenna switching circuit 20, the transmit signal STX amplified to the fixed transmitting power by the power amplifier 13 is inputted to the duplexer circuit 1 via the isolator 10. In the duplexer circuit 1, the transmit signal STX of transmitting frequency band fT is selectively led to the antenna terminal by the band-pass filter 2 and thus said transmit signal STX is emitted in space from the transmit-receive common antenna 4.

On the other hand, at the time when receiving, the receive signal SRX received by the transmit-receive common antenna 4 is led to the duplexer circuit 1. In the duplexer circuit 1, the receive signal SRX of the receiving frequency band fR will be selectively led to the switch 21. At this point, the band-pass filter 6 has an effect on attenuating unnecessary wave out of the receiving band.

Moreover, the receive signal SRX received by a second antenna 22 for diversity receiving is led to the switch 24 through the band-pass filter 23 which attenuates unnecessary radio waves out of receiving band.

Here, the switches 21 and 24 are switches for switching the antenna in case of diversity receiving, and when selecting the transmit-receive common antenna 4, the switch 21 becomes in the on condition and the switch 24 becomes in the off condition, and when selecting the receive only antenna 22, the switch 21 is in the off condition and the switch 24 becomes in the on condition.

With this arrangement, the receive signal SRX having higher signal strength selected by the on/off of the switches 21 and 24 will be led to a high frequency amplifier 25 of the receiving unit.

At this point, the switches 21 and 24 will be explained below. In the case where a diode is used as a high frequency switch element, circuits as shown in FIG. 5 will be used. In this FIG. 5, a diode 30 functions as the high frequency switch and generally a PIN diode having high frequency characteristic is used. Condensers 31 and 32 block direct current components and pass through only high frequency signals. Coils 33 and 34 block high frequency signals and pass through direct current components. A condenser 35 forms a filter with the coil 33 and protects the leakage of high frequency signal to the power source 36 and stabilizes circuits. A resistance 37 controls the current flowing to the diode 30. The switch 38 controls the supply of the power source 36 formed of direct current power source and switches the on-off of the diode 30.

According to the foregoing construction, if the switch 38 is set in the on condition, bias current supplied from the power source 36 passes through the resistance 37 and biases the diode 30 in the forward direction through the coil 33 and flows toward the cathode side of the power source 36 through the coil 34. At this point, the diode 30 in which bias current flows in the forward direction becomes in the low impedance condition in high frequency and the diode switch is in the on condition. Thus, the receive signal SRX inputted to the terminal P1 will be outputted from the terminal P2.

Moreover, if the switch 38 is put in the off condition, bias current would not flow into the 30 but the diode 30 becomes in the high impedance condition in high frequency and the diode switch is in the off condition. Thus, the receive signal SRX would not be outputted from the terminal P2.

Furthermore, in the case where an FET (i.e., field effect transistor) is used as a high frequency switch element, circuits as shown in FIG. 6 will be used. In this FIG. 6, an FET 40 functions as a high frequency switch and generally GaAs (gallium arsenic) FET having high frequency characteristic will be used.

In this connection, in the case of using an FET as a switching device, impressing gate bias sufficiently higher than the pinch-off voltage of the FET, the FET is controlled in the on condition by lowering the impedance between drain-to-source. On the other hand, the FET is controlled in the off condition by increasing the impedance between drain-to-source by impressing the gate bias which is sufficiently lower than the pinch-off voltage of the FET.

Condensers 41 and 42 block direct current and pass through only high frequency signals. Resistances 43–45 are of high impedance with high frequency respectively and give the bias voltage to the FET 40. When the resistance 46 puts the FET 40 in the off condition, it makes the gate voltage equal to grounded potential. The condenser 47 forms a filter with the resistance 43 and the preventing the leakage of high frequency signal to the source 48, stabilizes circuit. The switch 49 controls the supply of the source 48 formed of direct current source and switches the on-off of the FET 40.

At this point, the electric potentials of the drain and source of the FET 40 are biased to the positive voltage by the source 48 through the resistances 43 and 44. Under this condition, when the switch is put in the on condition, the gate potential of the FET 40 is biased to the positive voltage through the resistance 45 and as a result, drain-to-source of the FET 40 becomes in the low impedance condition with high frequency and the FET switch is in the on condition. Thus, the input signal SRX inputted to the terminal P1 will be outputted from the terminal P2.

Furthermore, when the switch 49 is set in the off condition, the gate potential of the FET 40 becomes grounded potential through the resistances 45 and 46, and the FET 40 is in the biased condition lower than the pinch-off voltage. As a result, drain-to-source becomes in the high impedance condition with high frequency and the FET switch becomes in the off condition. Thus, the input signal SRX would not be outputted from the terminal P2.

As shown in FIG. 4, in the conventional antenna switching circuit 20, the power outputted from a power amplifier 13 is supplied to the antenna 4 through an isolator 10 and the band-pass filter 2 of the duplexer circuit 1. However, since the band-pass filter having steep out of band attenuation characteristic is generally used for the band-pass filter 2, the insertion loss is large resulting in the wasteful consumption of the power as the antenna switching circuit 20.

Moreover, in the antenna switching circuit 20, the duplexer circuit 1, which is a combination of filters having steep out of band attenuation characteristic, has a weak point due to its large physical dimensions.

Furthermore, in the antenna switching circuit 20, at the time of receive operating, either one of switches for switching the antennas 21 and 24 will be put in the on condition. However, if the switches 21 and 24 are formed by diode switches as shown in FIG. 5, consumption of the current will be increased for the amount of bias current flowing in the diode 30 and this results in an increase of consumption of the power. Especially in the case of portable telephone being operated by batteries, there is a possibility of shortening the standby operating time.

Moreover, in the case of diode switch as shown in FIG. 5, when the diode 30 is in the off condition, potentials of anode and cathode become the same, and in order to increase the isolation it is desirable to give reverse bias to the diode 30. However, the device giving the negative voltage to the anode of the diode 30 by adding power source circuits such as DC—DC converter in order to realize the above, results in an increase of circuit structure and this device is considered to be not practical in a small portable equipment.

SUMMARY OF THE INVENTION

In view of the foregoing, an object of the present invention is to provide an antenna switching circuit and a wireless communication system utilizing same that is capable of further reducing the insertion loss as well as miniaturizing the whole construction as compared with the conventional device.

The foregoing object and other objects of the present invention have been achieved by that the antenna switching circuit is formed by a 3-terminal circulator element, of the three terminals the first terminal is connected to the transmitting circuit, the second terminal is connected to a first antenna and the third terminal can be connected to the terminal resistance through a first switch element, a second switch element which is capable of connecting the third terminal of the circulator element to the receiving circuit, and a third switch element capable of connecting a second antenna to the receiving circuit.

Furthermore, according to the present invention, in the case where the first, second and third switch elements are formed of diode elements, the cathode sides of diode elements will be connected in DC respectively.

Also, according to the present invention, in the case where the first, second and third switch elements are formed of diode elements, the cathode sides of diode elements are connected to the power source input terminals of the predetermined circuits respectively.

Furthermore, according to the present invention, in the case where the first, second and third switch elements are formed of diode elements or transistor elements, at the time when the first, second or third switch element is set in the off condition, the negative voltage to be used when driving the transmitting power amplifier of the transmitting circuit will be used as the bias voltage.

Since the antenna switching circuit is formed by a 3-terminal circulator element, of which a first terminal is connected to the transmitting circuit, a second terminal is connected to a first antenna and the third terminal can be connected to the terminal resistance through a first switch element, a second switch element which is capable of connecting the third terminal of circulator element to the receiving circuit, and a third switch element capable of connecting the second antenna to the receiving circuit, the first antenna can be used in common for both transmitting and receiving without using the duplexer circuit having a large insertion loss as before.

Furthermore, in the case where first, second and third switch elements are formed of diode elements, since cathode sides of diode elements are connected in DC respectively, if one out of 3 switch elements is set in the on condition by flowing bias current, the off condition switch element can be set in the reverse bias condition by said bias current.

Moreover, in the case where first, second and third switch elements are formed of diode elements, since cathode sides of diode elements are connected to the power source input terminals of the predetermined circuit respectively, the bias current at the time when setting the switch element in the on condition would not be wasted but effectively utilized in the predetermined circuit.

Furthermore, in the case of setting a first, a second or a third switch element in the off conditions, since the negative voltage to be used when driving the transmitting power amplifier to amplify the transmitting circuit is used as the bias voltage, the off condition switch element can be set deeply in the reserve bias condition, and this will result in reduction of switch element distortion by the transmitting power and improvement of switch element isolation can be achieved.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) First Embodiment

Figure 1:
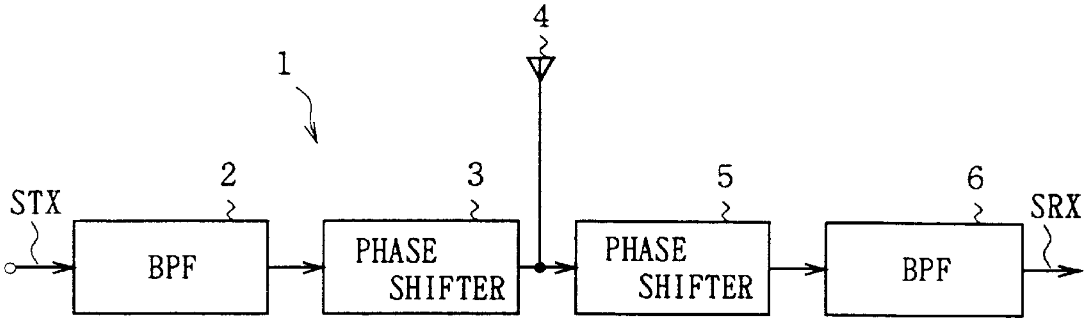
FIG. 1 (RELATED ART)
FIG. 1 is a block diagram showing the construction of a duplexer circuit.
Figure 2:
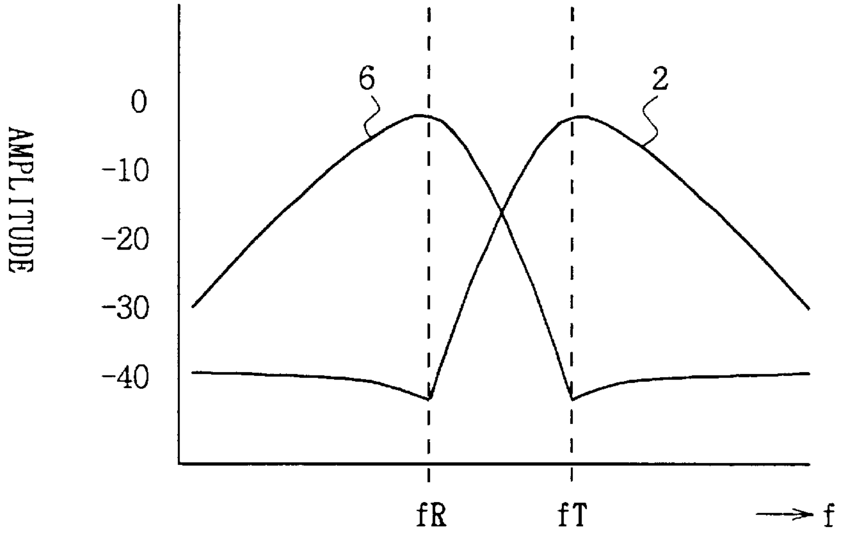
FIG. 2 (RELATED ART)
FIG. 2 is a characteristic curvilinear diagram showing the characteristic of band-pass filter of the duplexer circuit.
Figure 3:
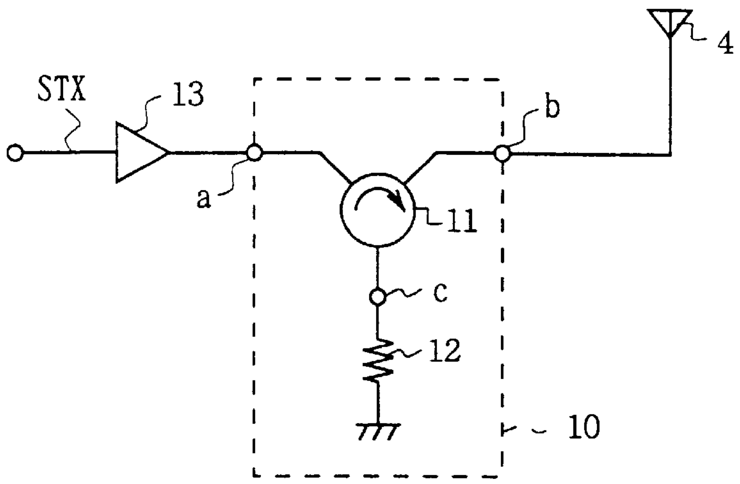
FIG. 3 (RELATED ART)
FIG. 3 is a connection diagram showing the construction of an isolator.
Figure 4:
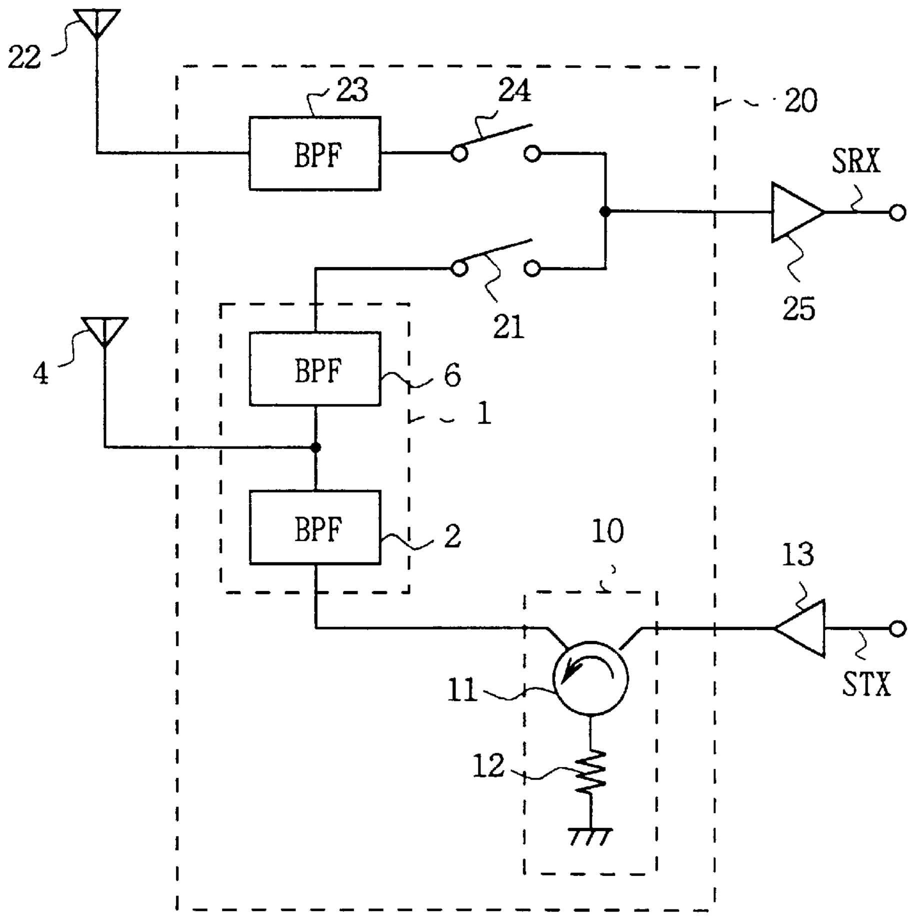
FIG. 4 (RELATED ART)
FIG. 4 is a connection diagram showing the construction of the conventional antenna switching circuit.
Figure 5:
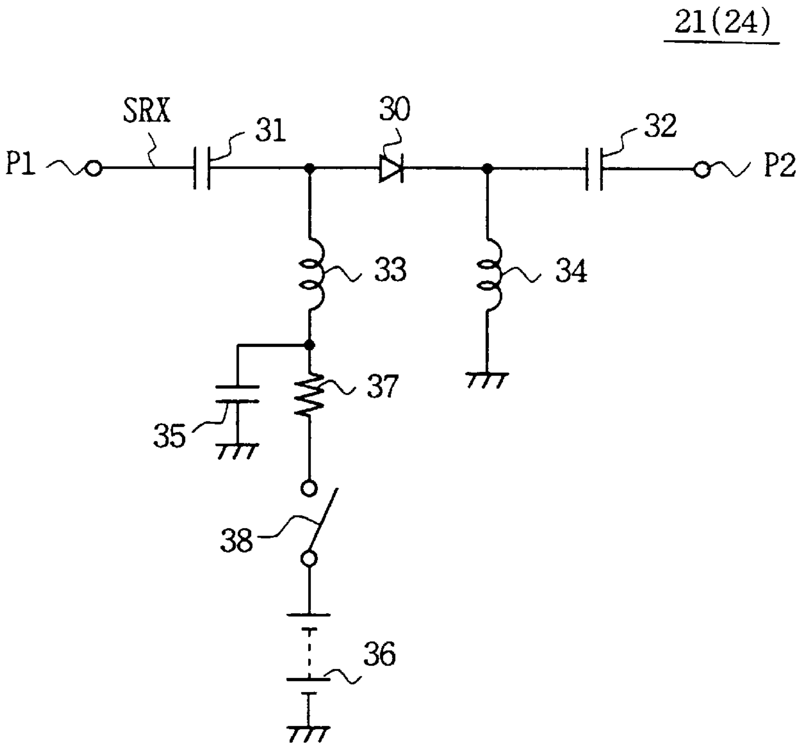
FIG. 5 (RELATED ART)
FIG. 5 is a connection diagram in case of using a diode as a high frequency switch.
Figure 6:
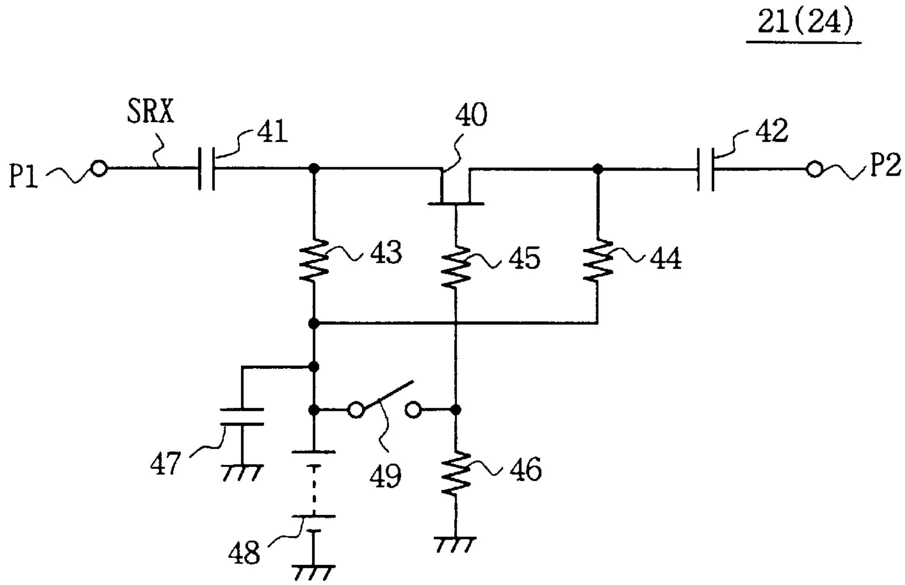
FIG. 6 (RELATED ART)
FIG. 6 is a connection diagram in case of using an FET as a high frequency switch.
Figure 7:
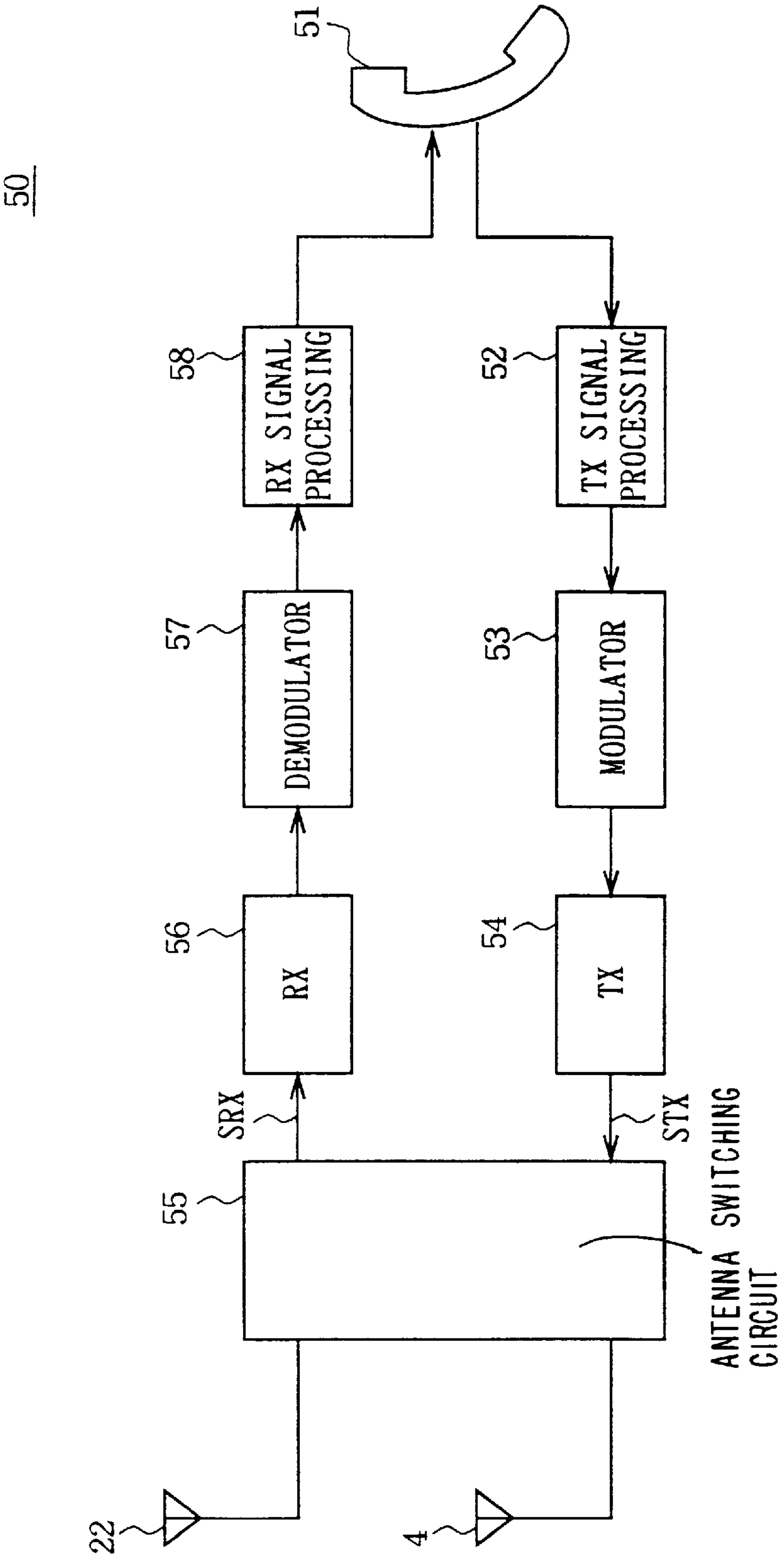
FIG. 7 is a block diagram showing the construction of a digital cellular telephone applying an antenna switching circuit according to the present invention.

In FIG. 7, 50 generally shows a digital cellular telephone system applying the present invention, and by transmitting and receiving signals by means of time division multiple access one is able to communicate with the desired partner.

This digital cellular telephone 50 repeats transmission and reception with a period of about 20 msec in utilizing the bandwidths of transmitting frequency 1429–1453 [MHz] and receiving frequency 1477–1501 [MHz] and as well as outputting digital signal to the fixed base station, receives digital signal transmitted from the base station. Thus, the digital cellular telephone 50 can communicate with the desired partner through the base station.

In this connection, transmitting and receiving frequencies are separated by 48 [MHz] each other.

In this digital cellular telephone 50, the voice inputted to the microphone of the handset 51 is converted to a speech signal and outputted to a TX signal processing circuit 52 comprising the transmission baseband signal processing unit. The TX signal processing circuit 52 after converting the inputted speech signal to a digital signal outputs to a modulator 53 upon converting to the transmission data fitting to the transmission slot.

The modulator 53 modulates this transmission data to a $\pi/4$ shift DQPSK (differential quadrature phase shift keying) signal and outputs to the following transmitting unit (TX)

54. The transmitting unit 54, as well as converting the π/4 shift DQPSK signal to the assigned transmitting frequency signal, amplifies the power and outputs this to the antenna switching circuit 55 as a transmit signal STX.

The antenna switching circuit 55 supplies the transmit signal STX inputted to the antenna 4. Thus, the digital cellular telephone 50 transmits the speech signal with the fixed communication format from the antenna 4.

On the other hand, in the digital cellular telephone 50, out of the high frequency signal received by the transmit-receive common antenna 4 and the high frequency signal received by the diversity antenna 22, the high frequency signal having higher signal strength will be selected by the antenna switching circuit 55 and inputted to the receiving unit (RX) 56 as a receive signal SRX.

The receiving unit 56, frequency converting the inputted receive signal SRX receives the signal of the predetermined communication channel. A demodulator 57 demodulates a π/4 shift DQPSK signal received by this receiving unit 56 to a digital signal and outputs to the RX signal processing circuit 58 comprising the receive baseband signal processing unit. The RX signal processing circuit 58 demodulates a speech signal from the digital signal inputted. Thus, in the digital cellular telephone 50, the demodulated speech signal will be outputted from a speaker of the handset 51.

At this point, when transmitting, the antenna switching circuit 55, as well as efficiently transmitting the transmitting power to the antenna 4, high frequency isolates the receiving unit 56 in order that the receiving unit 56 would not be destroyed by the transmitting power. Moreover, when receiving, the antenna switching circuit selects a high frequency signal having higher signal strength from high frequency signals received by the transmit-receive common antenna 4 and the diversity receiving antenna 22 and transmits efficiently to the receiving unit 56.

Figure 8:
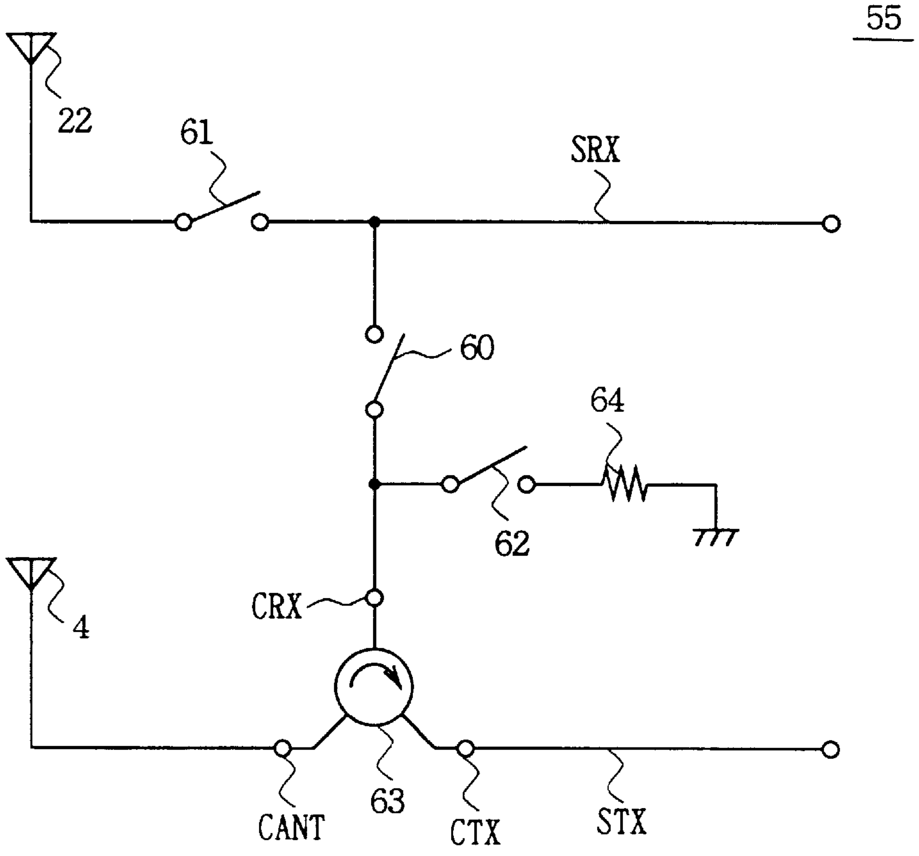
FIG. 8 is a connection diagram showing the basic construction of an antenna switching circuit according to the first embodiment of the present invention.

The antenna switching circuit 55 is constructed by the basic circuit construction as shown in FIG. 8. However, in order to simplify the explanation, first the antenna switching circuit 55 will be described in utilizing a connection diagram showing the basic construction.

As shown in FIG. 8, the antenna switching circuit 55 comprises 3 high frequency switches 60–62, a circulator 63, and a terminal resistance 64. Of 3 terminals of the circulator 63, one terminal CTX is connected to the transmitting unit 54 (not shown in FIG.), a terminal CANT is connected to the transmit-receive common antenna 4, and a terminal CRX is connected to the terminal resistance 64 through the high frequency switch 62.

Moreover, the terminal CRX of the circulator 63 is to be connected to the receiving unit 56 (not shown in FIG. 8 through the high frequency switch 60. Also, the diversity receiving antenna 22 is to be connected to the receiving unit 56 through the high frequency switch 61.

In the antenna switching circuit 55, when transmitting, high frequency switches 60 and 61 are put in the off conditions and the high frequency switch 62 is put in the on condition, and the transmit signal STX outputted from the power amplifier of the transmitting unit 54 will be inputted to the terminal CTX of the circulator 63. As shown in FIG. 8, since signals are transmitted in the direction of clockwise in the circulator 63, the transmit signal STX will be led to the terminal CANT from the terminal CTX. Thus, the transmit signal STX is supplied to the transmit-receive common antenna 4 and emitted in space.

At this point, since the terminal CRX of the circulator 63 is terminated at the terminal resistance 64 through the high frequency switch 62, the circulator 63 functions as an isolator. That is, the reflected wave produced by the mismatching of the antenna 4 will not return to the transmitting unit 54 side but will be consumed at the terminal resistance 64 and thus the transmitting unit 54 can be protected from the reflection wave.

On the other hand, when receiving signals, in the case of selecting the transmit-receive common antenna 4 and receiving signals, high frequency switches 61 and 62 are set in the off condition and the high frequency switch 60 is set in the on condition. Although the transmit signal SRX received by the antenna 4 is led to the terminal CANT of the circulator 63, the receive signal SRX will be led to the terminal CRX because signals are transmitted in the clockwise direction in the circulator 63. Thus, the transmit signal SRX will be supplied to the receiving unit 56 through the high frequency switch 60.

Furthermore, when receiving signals, in the case of selecting the diversity receiving antenna 22 and receiving signals, the high frequency switch 61 is in the on condition and the high frequency switches 60 and 62 are set in the off condition. Thus, the signal SRX received by the antenna 22 will be supplied to the receiving unit 56 through the high frequency switch 61.

Accordingly, in the antenna switching circuit 55, the high frequency switch 62 is provided between the circulator 63 and the terminal resistance 64, and the high frequency switch 60 is provided between the circulator 63 and the receiving unit 56, and in utilizing the circulator 63 as a separated element of the received signal SRX the antenna 4 can be used for transmitting and receiving without using the duplexer circuit having large insertion loss and large physical dimension, and thereby the general construction can be simplified as well as the insertion loss can be reduced as compared with the conventional device. Moreover, the high frequency switch 61 is provided between the diversity receiving antenna 22 and the receiving unit 56, and by controlling the on-off conditions of said high frequency switches 61 and 60, diversity receiving becomes possible by switching the antennas 4 and 22, and thus the receiving power can be improved.

Figure 9:
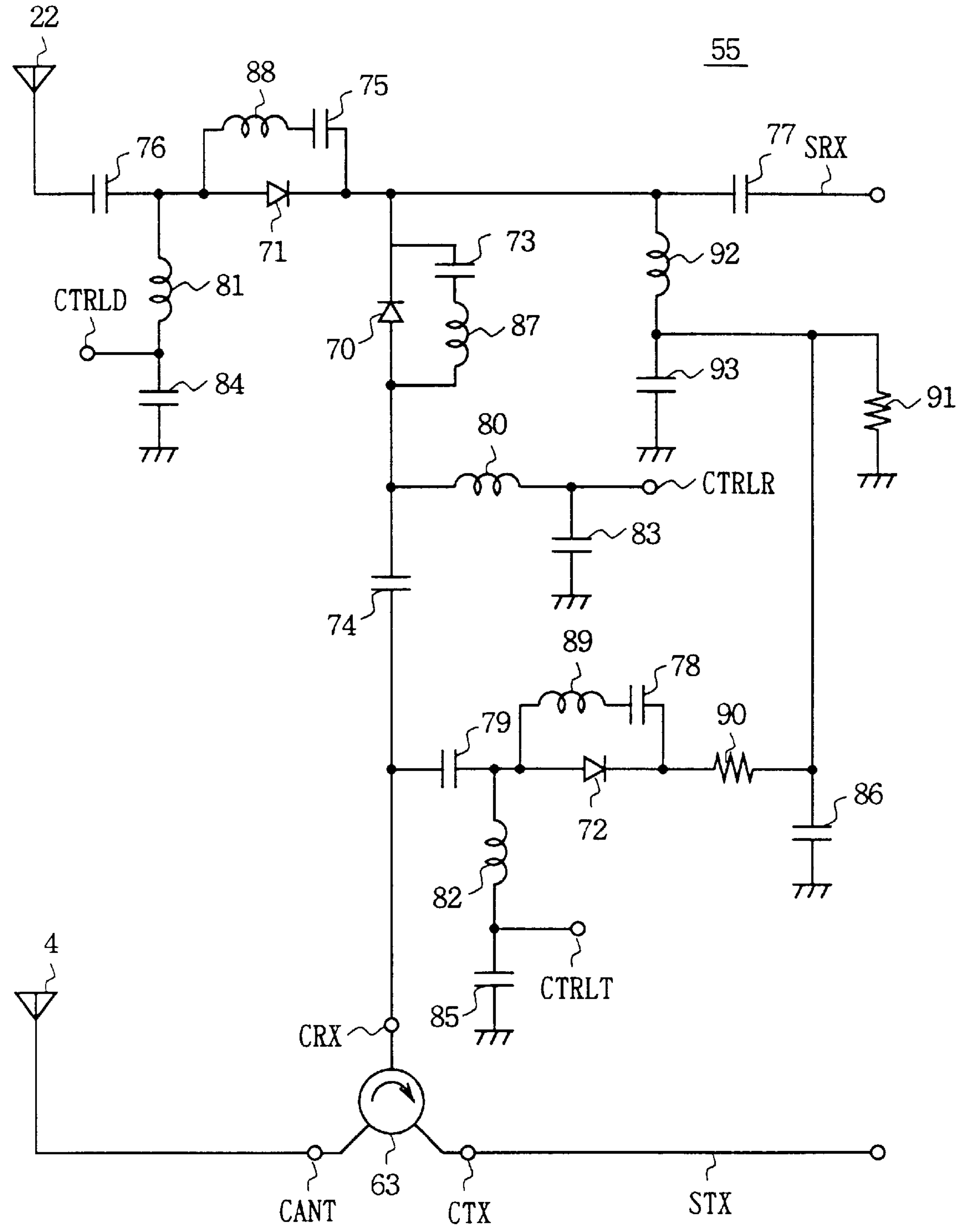
FIG. 9 is a connection diagram showing the concrete construction of an antenna switching circuit in case of utilizing diode switches.

Here, the circuit construction in which the common antenna 55 shown in FIG. 8 is realized in a concrete form will be shown in FIG. 9. In this FIG. 9, diodes 70–72 are elements which correspond to the high frequency switches 60–62 in FIG. 8 respectively. A condenser 73 connected in parallel to the diode 70, a condenser 74 inserted between the diode 70 and the circulator 63, a condenser 75 connected in parallel to the diode 71, a condenser 76 inserted between the diode 71 and the diversity receiving antenna 22, a condenser 77 connected to the cathode side of the diode 71, a condenser 78 connected in parallel to the diode 72 and a condenser 79 inserted between the diode 72 and the circulator 63 are condensers for blocking direct current components.

Moreover, a coil 80 connected to the anode side of the diode 70, a coil 81 connected to the anode side of the diode 71, a coil 82 connected to the anode side of the diode 72 and a coil 92 connected to the cathode side of the diode 71 are choke coils for supplying bias currents to the diodes 70, 71 and 72 respectively.

Furthermore, condensers 83–85 connected to one ends of the coils 80–82 and condensers 93 and 86 connected to one end of the coil 92 are condensers for decoupling and prevent the leakage of high frequency signals to the power source through control terminals CTRLR, CTRLD and CTRLT and stabilize the circuits.

Furthermore, coils 87–89 which are connected in parallel to the diodes 70–72 are coils for improving isolation of the diodes 70–72 respectively. In this connection, the coil for improving isolation has been disclosed in the Japanese Patent Laid-open No. 6-291696 bulletin, and it can be explained briefly as follows. By connecting high frequency switch elements (in this case the diodes 70–72) in parallel with coils, parallel resonance occurs by the capacitance component of the high frequency switch element and the inductance component of coil, and thus isolation can be improved when the high frequency switch element is in the off condition.

A resistance 90 connected in series to the cathode side of the diode 72 is the terminal resistance of the circulator 63, and at the time when transmitting, the reflection wave produced due to the mismatching of the antenna 4 will be consumed by this resistance 90. Also, the resistance 91 connected to this resistance 90 is the resistance for current control of bias current flowing through the diodes 70–72.

At this point, in order to control the on-off condition of the diode switches (70–72) three control terminals CTRLR, CTRLD and CTRLT are provided in the antenna switching circuit 55 and by controlling the voltage to be given to these control terminals CTRLR, CTRLD and CTRLT, on-off condition of diode switches will be controlled.

More specifically, at the time when transmitting, if the positive voltage is given to the control terminal CTRLT and such as 0 [V] voltage is given to control terminals CTRLR and CTRLD, bias current flows in the diode 72 and it becomes in the on condition while diodes 70 and 71 become in the off condition because bias current does not flow in diodes 70 and 71. Thus, the transmit signal STX outputted from the transmitting unit 54 is supplied to the antenna 4 through the circulator 63 and emitted in space. Also the reflected wave produced due to the mismatching of the antenna 4 flows in the resistance 90 through the circulator 63 and is converted to heat and consumed (i.e., the circulator 63 functions as an isolator). At this point, because diodes 70 and 71 are in the off conditions, the transmitting unit 56 (not shown in FIG. 9 is cut off in high frequency, and thus the transmit signal STX can be prevented from flowing in the transmitting unit 56.

On the other hand, at the time when receiving, in the case of selecting the transmit-receive common antenna 4 and receiving signals, positive voltage is given to the control terminal CTRLR and such as 0 [V] voltage is given to control terminals CTRLD and CTRLT. With this arrangement, the diode 70 is in the on condition since bias current flows, while diodes 71 and 72 become in the off condition since no bias current flows in. Thus, high frequency signal received by the antenna 4 will be selected and supplied to the receiving unit 56 as the receive signal SRX.

Furthermore, at the time of receiving, in the case of selecting the diversity receiving antenna 4 and receiving signals, the positive voltage is given to the control terminal CTRLD and such as 0 [V] voltage is given to control terminals CTRLR and CTRLT. With this arrangement, since bias current flows in the diode 71, it becomes in the on condition, and since no bias current flows in diodes 70 and 72, they become in the off conditions. Thus, the high frequency signal received by the antenna 22 is selected and supplied to the receiving unit 56 as a receive signal SRX.

Hence, in the antenna switching circuit 55, at the time when transmitting, as well as the transmitting unit 54 of the power amplifier can be protected from the reflected wave by making the circulator 63 to function as an isolator, the transmitting power can be supplied to the transmit-receive common antenna 4 with low loss because it is not passing through a duplexer circuit as in the past. Moreover, in the antenna switching circuit 55, at the time when transmitting, since the receiving unit 56 is high frequency cut off by putting diode switches (70, 71) in the off condition, the transmit signal STX can be prevented from leaking to the receiving unit 56 and destruction of the receiving unit 56 by the transmit signal STX can be effectively prevented. Furthermore, in the antenna switching circuit 55, when receiving signals, by on-off controlling diode switches (70, 71), the desired wave received by the transmit-receive common antenna 4 and the diversity receiving antenna 22 can be selected and supplied to the receiving unit 56 with the low loss.

Supposing that control terminals CTRLR, CTRLD and CTRLT are controlled with such as 0 [V] and+5 [V] voltages and the bias current necessary for setting diodes (70–72) in on conditions is approximately 1 [mA] and the forward voltage Vf of diodes (70–72) is 0.8 [V], at the time when transmitting, since the voltage of the control terminal CTRLT is+5 [V], the cathode of the diode 72 becomes+4.2 [V]. Since the terminal resistance (90) is the characteristic impedance of a high frequency circuit, normally it is about 50 [Ω] and in the case where the bias current is 1 [mA], about 4.2 [V] voltage is generated in the resistance for current control 91 since the voltage drop in the terminal resistance can be almost ignored (i.e., the resistance 91 is about 4.2 [KΩ]).

However, since the resistance for current control 91 is connected to the cathode sides of two other diodes 70 and 71, these diodes 70 and 71 become in the reverse bias conditions of about 4.2 [V]. In this case, about 0 [V] voltage is impressed to the anodes of said diodes 70 and 71 to put diodes 70 and 71 in the off conditions. And as described above, if about+4.2 [V] voltage is impressed to the cathode side, diodes 70 and 71 become in the reverse bias condition of about 4.2 [V]. Accordingly, since diodes 70 and 71 become in the reverse bias conditions, said diodes 70 and 71 can be prevented from becoming to the on condition following the transmitting power when the transmitting power is large, and isolation of diode switches (70, 71) can be improved.

Regarding the function to improve the isolation, the same applies to both cases when selecting the antenna 4 and when selecting the antenna 22 and receiving signals.

Accordingly, in the antenna switching circuit 55, since cathode sides of diodes 70–72 are connected in DC, of three diodes 70–72 one diode is set in the on condition and the remaining two diodes automatically become in the reverse bias conditions and thus isolation of diode switches (70–72) can be improved.

Here, the bias circuit for giving bias current to diodes 70–71 through each control terminal CTRLR, CTRLD and CTRLT will be described in the following paragraphs referring to FIG. 10.

In the case of portable type devices operated with the aid of batteries, GaAs (gallium arsenic) FET having high efficiency is generally used. In general, because the pinch-off voltage of this FET is negative, the negative voltage is necessary for gate bias.

Figure 10:
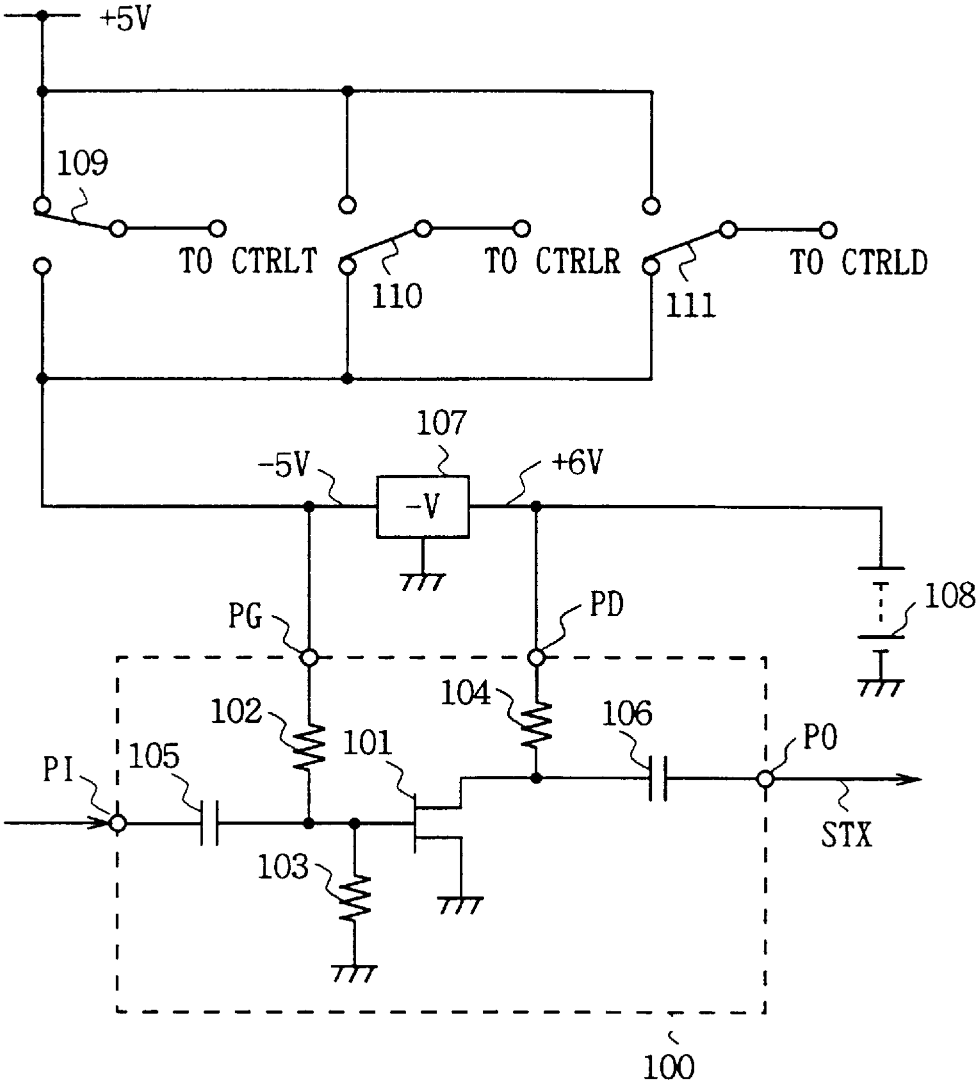
FIG. 10 is a connection diagram showing the construction of a bias circuit in case of using the negative voltage source.

In the case of this embodiment, as shown in FIG. 10, normally a GaAs FET 101 is used in a power amplifier 100 of the transmitting side and the negative voltage source 107 is provided to drive this FET 101.

This power amplifier 100 has four terminals, input (PI), output (PO), drain source (PD) and gate bias ((PG), and the gate bias terminal (PG) is connected to the output terminal of the negative voltage source 107 in order to supply negative voltage. In this connection, generally a DC—DC converter circuit is used as the negative voltage source 107, and such as−5 [V] voltage is generated depending on+6 [V] voltage to be outputted from the power source 108 and will be outputted. Moreover, the negative voltage source 107 is capable of stopping the operation at the time when not transmitting and thus the consumption of electric current can be reduced.

The output terminal of this negative voltage source 107 is further connected to one ends of switches 109–111 respectively. The other ends of the switches 109–111 are connected to the voltage of+5 [V] respectively. Thus, the switches 109–111 can select either−5 [V] or+5 [V]. The voltage selected here will be supplied to said control terminals CTRLR, CTRLD and CTRLT respectively as the voltage to control the on-off conditions of the diodes 70–72.

More specifically, in the case of setting the diodes 70–72 in the on conditions, +5 [V] will be supplied as bias voltage, while in the case of setting diodes 70–72 in the off conditions, −5 [V] will be supplied as reverse bias voltage.

However, in order that the negative voltage source 107 stops its operation and outputs 0 [V] voltage when not transmitting, in practice, the diodes 70–72 are on-off controlled with+5 [V] and −5 [V] when transmitting and when not transmitting such as standby operating, they are on-off controlled with+5 [V] and 0 [V].

Hence, in the antenna switching circuit 55, by using negative voltage being used in the power amplifier of the transmitting side as the bias voltage, the reverse bias voltage is increased when transmitting and diodes in the off conditions can be in the reverse bias conditions deeply. Thus, when transmitting, if the diode which is in the off condition is put in the reverse bias condition deeply, distortion of the diode in the off condition can be reduced when the transmitting power is large, and as well as unnecessary spurious emissions can be controlled, isolation of the diode in the off condition can be increased and destruction of the receiving unit can be prevented.

According to the foregoing construction, in the antenna switching circuit 55, at the time when transmitting, the diode switch (72) shown in FIG. 9, is put in the on condition and the diode switches (70, 71) are put in the off condition. Thus, the transmit signal STX outputted from the power amplifier of the transmitting unit 54 will be supplied to the transmit-receive common antenna 4 through the circulator 63 and emitted in space. At this point, since the terminal CRX of the circulator 63 is connected to the terminal resistance 90 through the diode switch (72), the circulator 63 functions as an isolator.

On the other hand, at the time when receiving, in the case of selecting the transmit-receive common antenna 4 and receiving signals, in the antenna switching circuit 55, the diode switch (70) is put in the on condition and diode switches (71, 72) are put in the off conditions. Thus, the receive signal SRX received by the antenna 4 will be led to the receiving unit 56 by the circulator 63 and diode switch (70); i.e., the circulator 63 switches the connection route of the antenna when transmitting and when receiving similar to that of the conventional duplexer circuit.

Moreover, in the case of selecting the diversity receiving antenna 22 and receiving signals, diode switch (71) is put in the on condition and diode switches (70, 72) are put in the off condition in the common antenna 55. Thus, the receive signal SRX received by the antenna 22 will be led to the receiving unit 56 by the diode switch (71).

Accordingly, in the antenna switching circuit 55, since the circulator 63 which functions as an isolator is used as an element to switch the connection route of the antenna 4, it is no longer necessary to use the conventional duplexer circuit having large insertion loss and the whole construction can be smaller sized by not using the duplexer circuit.

Furthermore, in the case of this embodiment, since cathode sides of diode switches (70–72) are DC connected respectively, if a one switch out of three diode switches (70–72) is put in the off condition, reverse bias voltage can be given to the other diode switches in the off condition. Thus, diode switches in the off condition can become in reverse bias condition and the isolation of diode switch can be improved.

Furthermore, in the case of this embodiment, as shown in FIG. 10, since the negative voltage to be obtained from the negative voltage source 107 being used in the power amplifier 100 of the transmitting unit 54 is used as bias voltage of diode switches (70–72), when transmitting signals, the diode switches in the off conditions can be put in the reverse bias conditions deeply, and as well as distortion of the diode switch can be reduced, isolation of the diode switch can be improved.

Hence, according to the foregoing construction, since the antenna switching circuit 55 is constructed by a 3-terminal circulator 63, of three terminals a terminal CTX is connected to the transmitting unit 54 side, a terminal CANT is connected to the transmit-receive common antenna 4, and a terminal CRX can be connected to the terminal resistance 90 through the diode switch 72; the diode switch 70 capable of connecting the terminal CRX of the circulator 63 to the receiving unit 56 side and the diode switch 71 capable of connecting the diversity receiving antenna 22 to the receiving unit 56, the whole construction can be miniaturized as compared with the conventional device and the insertion loss can be reduced.

(2) Second Embodiment

Figure 11:
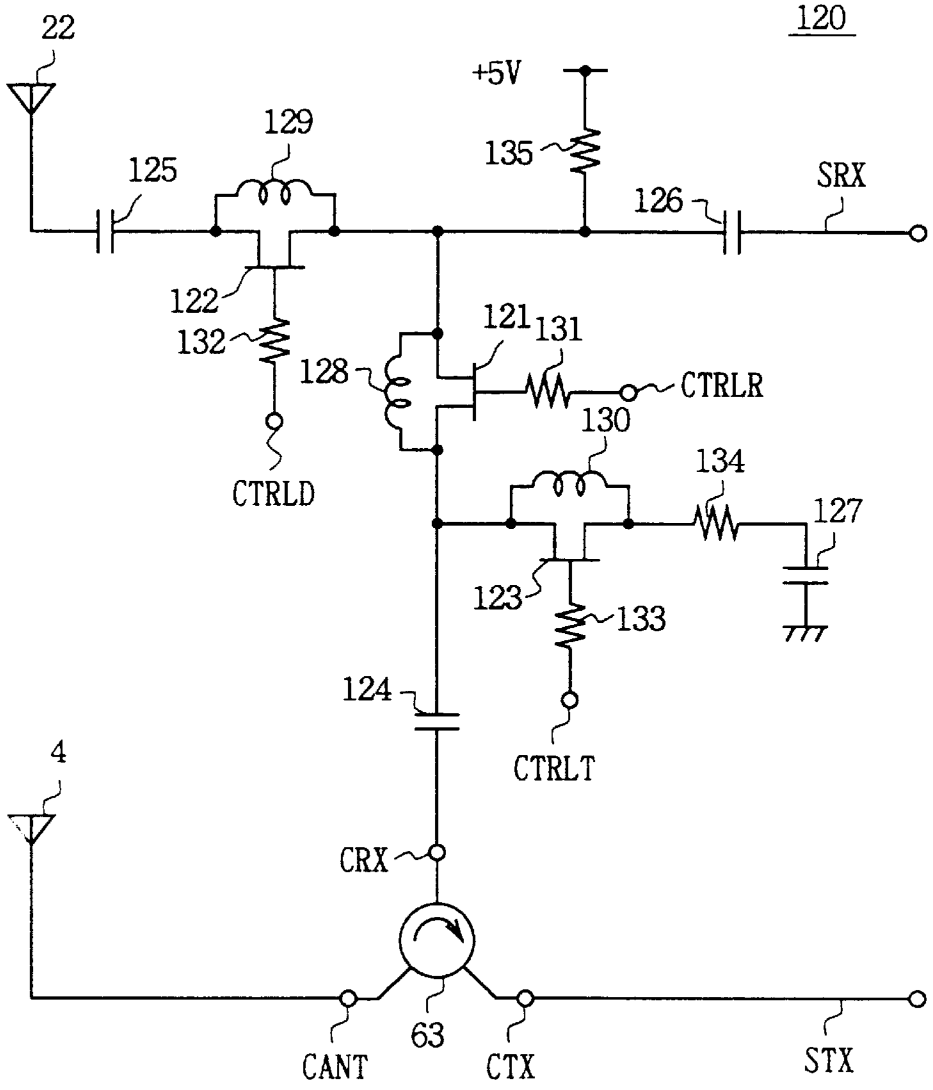
FIG. 11 is a connection diagram showing the construction of an antenna switching circuit according to the second embodiment using FET switches.

In FIG. 11, in which corresponding parts of FIG. 9 are given the same reference numerals, 120 generally shows an antenna switching circuit according to the second embodiment, in which FETs are used in place of the diodes 70–72 of the first embodiment.

In FIG. 11, FETs 121–123 are elements corresponding to the high frequency switches 60–62 in FIG. 8 respectively. Also, a condenser 124 inserted between the FET 121 and the circulator 63, a condenser 125 inserted between the FET 122 and the diversity receiving antenna 22, a condenser 126 inserted between the FET 122 and the receiving unit side, and a condenser 127 connected to the source side of the FET 123 are condensers for direct current component blocking.

Furthermore, a coil 128 connected between the drain-to-source of the FET 121, a coil 129 connected between the drain-to-source of the FET 122, and a coil 130 connected between the drain-to-source of the FET 123 are coils to improve isolations of the FETs 121–123. More specifically, these coils 128–130 contribute to the improvement of isolation in the FETs 121–123 are in the off conditions by resonating in parallel with capacitance components of the FETs 121–123 in the same manner as those of the first embodiment.

Moreover, resistances 131–133 connected to gates of the FETs 121–123 protect the leakage of high frequency signals passing through control terminals CTRLR, CTRLD and CTRLT to the source respectively and stabilize circuits. In this connection, high impedance resistances are used for these resistances 131–133.

The resistance 134 connected to the source side of the FET 123 is the terminal resistance wave circulator 63, and at the time when transmitting, reflected wave generated due to mismatching of the antenna 4 will be consumed by this resistance 134. The resistance 135 is a pull-up resistance to bias the drain and source of the FET 121–123 to+5 [V].

In this connection, as a bias circuit to give bias voltage to the control terminals CTRLR, CRTLD and CTRLT, the bias circuit shown in FIG. 10 is used as in the first embodiment.

According to the foregoing construction, at the time when transmitting, the antenna switching circuit 120 giving such as+5 [V] to the control terminal CTRLT puts the FET switch (123) in the on condition, and giving negative voltage to the control terminals CTRLR and CTRLD in the same manner as that of the first embodiment, puts the FET switches (121, 122) in the off conditions. Thus, a transmit signal STX will be supplied to the transmit-receive antenna 4 via the circulator 63 and emitted in space. At this point, since the terminal CRX of the circulator 63 is connected to the terminal resistance 134 through the FET switch (123), the circulator 63 functions as an isolator.

On the other hand, when receiving, in the case of selecting the transmit-receive common antenna 4 and receiving signals in the antenna switching circuit 120, giving such as+5 [V] to the control terminal CTRLR, the FET switch (121) is put in the on condition, and giving 0 [V] to the control terminals CTRLD and CTRLT, the FET switches (122, 123) are put in the off conditions in the same way as in the first embodiment. Thus, the receive signal SRX received by the antenna 4 is led to the receiving unit 56 by the circulator 63 and the FET switch (121).

Furthermore, in the case of selecting diversity receiving antenna 22 and receiving signals, in the common antenna 120, by giving such as+5 [V] to the control terminal CTRLD, the FET switch (122) is put in the on condition and by giving 0 [V] to the control terminals CTRLR and CTRLT, the FET switches (121, 123) are put in the off conditions as in the first embodiment. Thus, the receive signal SRX received by the antenna 22 will be supplied to the receiving unit 56 through the FET switch (122).

Accordingly, in the case of this embodiment, since the circulator 63 which functions as an isolator is used as an element to switch the connection route of the antenna 4, it is no longer necessary to use the duplexer circuit having large insertion loss as before and thereby insertion loss can be further reduced and the overall construction can be miniaturized for the part not using the duplexer circuit.

Furthermore, in the case of this embodiment, since the FETs 121–123 are power driving elements, it is enough just to give voltages to the control terminals CTRLR, CTRLD and CTRLT and almost no electric current would be consumed. As a result, in the antenna switching circuit 120 of this embodiment, consumption of electric currents can be further reduced as compared with the antenna switching circuit 55 of the first embodiment.

According to the foregoing construction, since the antenna switching circuit 120 is formed by a 3-terminal circulator 63, of three terminals the terminal CTX is connected to the transmitting unit 54, the terminal CANT is connected to the transmit-receive common antenna 4, and the terminal CRX capable of connecting to the terminal resistance 134 through the FET switch 123; the FET switch 121 which is capable of connecting the terminal CRX of circulator 63 to the receiving unit 56 side, and the FET switch 122 capable of connecting the diversity receiving antenna 22 to the receiving unit 56 side, as well as the whole construction can be miniaturized as compared with the past, the insertion loss can be reduced. Furthermore, by utilizing the FETs 121–123 as high frequency switch elements, consumption of electric currents can be reduced.

(3) Other Embodiments

Furthermore, in the first embodiment, consuming bias currents flow into the diodes 70, 71 or 72 by the resistance 91. However, the present invention is not only limited to this but if the resistance 91 is put in place of the predetermined circuit, and the bias circuit would be DC connected to the power source terminal of the predetermined circuit (i.e., if the cathode sides of the diodes 70, 71 and 72 are connected to the power source input terminal of the predetermined circuit), bias current would not be wasted but can be effectively utilized.

The above point will be described more in detail in the following paragraphs. In the antenna switching circuit 55, in either case when transmitting or receiving signals, one of diodes 70–72 becomes in the on condition. Thus, in either case the current of about 1 [mA] flows into the resistance 91 for current controlling and the voltage of about 4.2 [V] is generated at both terminals. More specifically, about 4.2 [mW] power is consumed by this resistance 91. Thus, replacing this resistance with the other predetermined electric circuit, the power consumed by the resistance 91 can be effectively utilized. Especially, if it can be used as a part of the electric source of the receiving unit 56 such as a receiving intermediate frequency amplifier, in the case of portable appliances to be operated with batteries, the consumption of currents can be reduced, thus making batteries durable and the standby operating time can be protracted.

Furthermore, in the embodiments described above, the antenna switching circuits 55, 120 are used in the digital cellular telephone 50. However, the present invention is not only limited to this but if the antenna switching circuits 55, 120 are applied to the other radio communication devices such as portable telephone, the same effects as those of the above embodiments can be obtained. Anyway, the present invention can be widely applied to the radio communication devices, provided, it is equipped with a first antenna for transmit-receive common use and a second antenna for diversity receiving, and transmits with the first antenna when transmitting signals and diversity receives with the first and second antennas when receiving signals.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An antenna switching circuit for use in a wireless communication system having a transmitting circuit, a receiving circuit, and first and second antennas, in which the first antenna is used for transmitting and receiving and the second antenna is used for diversity receiving, comprising:

a first switch element;

a terminal resistance;

a 3-D terminal circulator element having a first terminal connected to the transmitting circuit of said wireless communication system, a second terminal connected to the first antenna and a third terminal connected to the terminal resistance through the first switch element;

a second switch element for connecting the third terminal of said circulator element to the receiving circuit of said wireless communication system; and a third switch element for connecting said second antenna to said receiving circuit, wherein said first, second and third switch elements are formed of one of diode elements and transistor elements, and wherein the transmitting circuit includes a transmitting power amplifier and upon setting one of said first, second and third switch elements in the off condition, a negative voltage used for driving the transmitting power amplifier of said transmitting circuit is used as a bias voltage.

2. The antenna switching circuit according to claim 1, wherein when said first, second and third switch elements are formed of diode elements, cathode sides of said diode elements are connected to DC, respectively.

3. The antenna switching circuit according to claim 1, wherein when said first, second and third switch elements are formed of diode elements, anode sides of said diode elements are connected to bias voltage control terminals of the transmitting and receiving circuits, respectively.

4. An antenna switching circuit for use in a wireless communication system having a transmitting circuit, a receiving circuit, and first and second antennas, in which the first antenna is used for transmitting and receiving and the second antenna is used for diversity receiving, comprising:

a first switch element;

a terminal resistance;

a 3-D terminal circulator element having a first terminal connected to the transmitting circuit of said wireless communication system, a second terminal connected to the first antenna and a third terminal connected to the terminal resistance through the first switch element;

a second switch element for connecting the third terminal of said circulator element to the receiving circuit of said wireless communication system; and a third switch element for connecting said second antenna to said receiving circuit, wherein said first, second and third switch elements are formed of one of diode elements and transistor elements, and wherein the transmitting circuit includes a transmitting power amplifier and when said first, second and third which elements are formed of diode elements, and cathode sides of said diode elements are connected to DC, a negative voltage used for driving said transmitting power amplifier of the transmitting circuit is used as a bias voltage for setting said diode elements in respective off conditions.

5. An antenna switching circuit for use in a wireless communication system having a transmitting circuit, a receiving circuit, and first and second antennas, in which the first antenna is used for transmitting and receiving and the second antenna is used for diversity receiving, comprising:

a first switch element;

a terminal resistance;

a 3-D terminal circulator element having a first terminal connected to the transmitting circuit of said wireless communication system, a second terminal connected to the first antenna and a third terminal connected to the terminal resistance through the first switch element;

a second switch element for connecting the third terminal of said circulator element to the receiving circuit of said wireless communication system; and a third switch element for connecting said second antenna to said receiving circuit, wherein said first, second and third switch elements are formed of one of diode elements and transistor elements, and wherein the transmitting circuit includes a transmitting power supply and when said first, second and third switch elements are formed of diode elements, and anode sides of said diode elements are connected to power source input terminals of the transmitting and receiving circuits, respectively, a negative voltage used for driving the transmitting power amplifier of said transmitting circuit is used as a bias voltage in case of setting said diode elements in the off conditions.

6. A wireless communication system having a transmitting circuit, a receiving circuit, first and second antennas, the first antenna used for transmitting and receiving and the second antenna used for diversity receiving, and an antenna switching circuit for the first and second antennas, comprising:

a first switch element;

a terminal resistance;

a 3-terminal circulator element having a first terminal connected to the transmitting circuit of said wireless communication system, a second terminal connected to the first antenna and a third terminal can be connected to the terminal resistance through the first switch element;

a second switch element for connecting the third terminal of said circulator element to the receiving circuit of said wireless communication system; and a third switch element for connecting said second antenna to said receiving circuit, wherein the transmitting circuit includes a transmitting power amplifier and upon setting one of the first, second and third switching elements in an off condition, negative voltage used in case of driving the transmitting power amplifier of said transmitting circuit is used as a bias voltage for the first, second, and third switching elements.

7. The wireless communication system according to claim 6, wherein said first, second and third switch elements are formed of one of diode elements and transistor elements.

8. The wireless communication system according to claim 6, wherein when said first, second and third switch elements are formed of diode elements, cathode sides of the diode elements are connected to DC, respectively.

9. The wireless communication system according to claim 6, wherein when said first, second and third switch elements are formed of diode elements, anode sides of the diode elements are connected to bias voltage control terminals of the transmitting and receiving circuit respectively.

10. A wireless communication system having a transmitting circuit, a receiving circuit, first and second antennas, the first antenna used for transmitting and receiving and the second antenna used for diversity receiving, and an antenna switching circuit for the first and second antennas, comprising:

a first switch element;

a terminal resistance;

a 3-terminal circulator element having a first terminal connected to the transmitting circuit of said wireless communication system, a second terminal connected to the first antenna and a third terminal can be connected to the terminal resistance through the first switch element;

a second switch element for connecting the third terminal of said circulator element to the receiving circuit of said wireless communication system; and a third switch element for connecting said second antenna to said receiving circuit, wherein the transmitting circuit includes a power amplifier and when said first, second and third switch elements are formed of diode elements, and cathode sides of the diode elements are connected to DC, a negative voltage used for driving said transmitting power amplifier of the transmitting circuit is used as a bias voltage for setting the diode elements in off conditions.

11. A wireless communication system having a transmitting circuit, a receiving circuit, first and second antennas, the first antenna used for transmitting and receiving and the second antenna used for diversity receiving, and an antenna switching circuit for the first and second antennas, comprising:

a first switch element;

a terminal resistance;

a 3-terminal circulator element having a first terminal connected to the transmitting circuit of said wireless communication system, a second terminal connected to the first antenna and a third terminal can be connected to the terminal resistance through the first switch element;

a second switch element for connecting the third terminal of said circulator element to the receiving circuit of said wireless communication system; and a third switch element for connecting said second antenna to said receiving circuit, wherein the transmitting circuit includes a power amplifier and when said first, second and third switch elements are formed of diode elements, and cathode sides of the diode elements are connected to power source input terminals of the transmitting and receiving circuits respectively, a negative voltage used for driving the transmitting power amplifier of said transmitting circuit is used as a bias voltage for setting the diode elements in off conditions.

* * * * *